United States Patent [19]
Mauro et al.

[11] Patent Number: 5,339,722
[45] Date of Patent: Aug. 23, 1994

[54] APPLY AND RELIEF VALVE MECHANISM FOR A FLUID POWER APPARATUS

[75] Inventors: Daniel A. Mauro, South Bend; Kevin B. Martin, Rochester, both of Ind.

[73] Assignee: AlliedSignal Inc., Morristown, N.J.

[21] Appl. No.: 66,458

[22] Filed: May 24, 1993

[51] Int. Cl.$^5$ ............................................. F15B 9/10
[52] U.S. Cl. ................................. 91/376 R; 92/48; 92/98 R; 60/547.1
[58] Field of Search ............... 91/369.1, 376 R; 92/48, 92/49, 98 R, 98D, 99, 101; 60/547.1

[56] References Cited
U.S. PATENT DOCUMENTS

| | | | |
|---|---|---|---|
| 3,250,184 | 5/1966 | DeHoff | 92/99 |
| 3,410,179 | 11/1968 | Kytta et al. | 91/376 R |
| 3,151,532 | 10/1964 | Ayers, Jr. | 92/99 |
| 3,417,668 | 12/1968 | Lawson | 91/376 R |
| 4,718,326 | 1/1988 | Sugiura et al. | 91/376 R X |
| 4,961,846 | 10/1990 | Isakson | 210/31 |
| 5,031,404 | 7/1991 | Flory et al. | 91/376 R X |
| 5,086,690 | 2/1992 | Flory et al. | 91/376 R X |

Primary Examiner—Edward K. Look
Assistant Examiner—Hoang Nguyen
Attorney, Agent, or Firm—Larry J. Palguta; Leo H. McCormick, Jr.

[57] ABSTRACT

The improved apply and relief valve mechanism (111, 112, 115, 117, 119, 120, 130, 132) for a fluid power apparatus (10) comprises a valve rod (112) having at one end (114) an integral, enlarged diameter spring retainer section (119), at a second end (113) a plurality of longitudinally extending grooves or passageways (132) in the valve rod (112) and a circumferential groove (111), a generally cylindrically shaped seal/reaction piston (120, 130) attached to the second end (113) of the valve rod (112) by way of a snap ring (115) received within the circumferential groove (111), and a spring mechanism (117) disposed around the valve rod (112) to abut the spring retainer section (119) and bias the reaction piston (120, 130) into engagement with the snap ring (115). The passageways (132) in the second end (113) of the valve rod (112) provide for improved fluid flow so that the fluid power apparatus (10) will not experience self actuation.

9 Claims, 2 Drawing Sheets

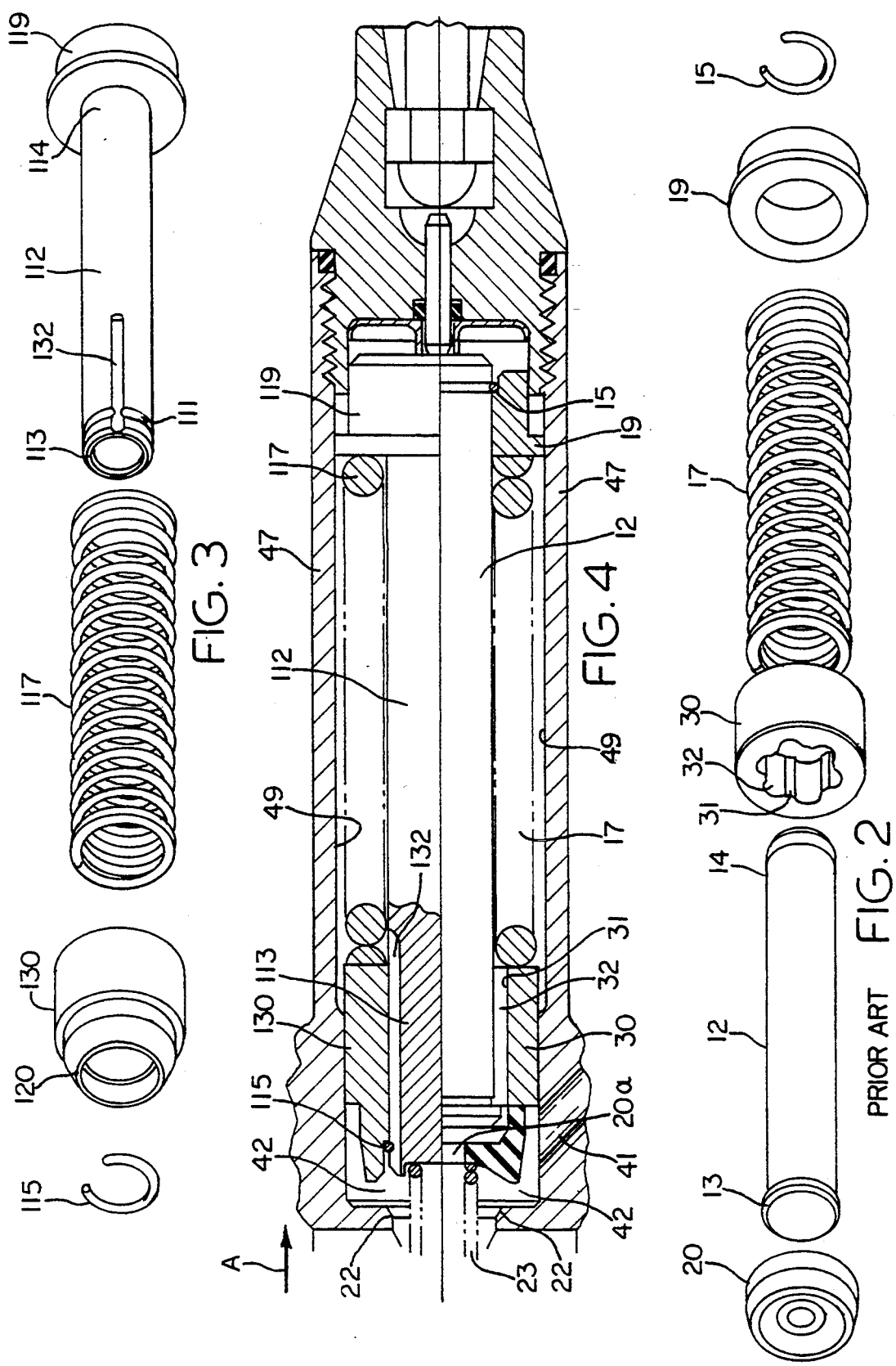

APPLY AND RELIEF VALVE MECHANISM FOR A FLUID POWER APPARATUS

An improved apply and relief valve mechanism, and in particular an improved apply and relief valve mechanism for a fluid power apparatus.

Hydraulic fluid power boosters for the operation of master cylinders have been utilized for many years. In certain hydraulic fluid power boosters, the booster operates by restricting fluid flow from one side of a power piston to the other side of the power piston, thereby creating a fluid pressure differential which effects a displacement of the power piston and operative power assisted displacement of the pistons of the master cylinder. Isakson U.S. Pat. No. 4,961,846, incorporated by reference herein, illustrates input rod 12 adjacent valve seal or popper 20 that abuts small spring 23 located within power piston 40. As also illustrated by FIGS. 1 and 2 herein, reaction piston 30 is located about rod 12 so that it abuts shoulder 13 of the rod. Reaction piston 30 includes a plurality of grooves 32 located about interior through passage 31 so that fluid may flow from one side of the reaction piston to the other. Spring 17 is located about rod 12 and abuts spring retainer 19 which is attached to end 14 of rod 12 by means of snap ring 15. When the relief valve mechanism comprising valve seal 20, valve rod 12, reaction piston 30, spring 17, spring retainer 19 and snap ring 15 is located within power piston 40, floating valve seal 20 must be located within the longitudinal opening or chamber 49 of the power piston and aligned with small spring 23 illustrated in U.S. Pat. No. 4,961,846 (also see the bottom portion of FIG. 4 herein). It is highly desirable to provide a valve seal 20 which does not float between its abutment with spring 23 and reaction piston 30. Also, it is highly desirable to improve the return of the valve mechanism to an at-rest position when braking application ceases, by eliminating any leakage that exists between valve seal 20 and abutting reaction piston 30. Grooves 32 in reaction piston 30 provide for fluid flow from the side of reaction piston abutted by spring 17 to the low pressure side of reaction piston 30 which is the area adjacent valve seal 20. Fluid flow in this direction is important because such fluid flow prevents the apply and relief valve mechanism from effecting a self application which would cause the fluid power apparatus to operate and suddenly apply the brakes of the vehicle.

The present invention provides solutions to the above problems by providing an improved apply and relief valve mechanism in combination with a fluid power apparatus, the apparatus comprising a housing, an input rod, a first chamber and a work chamber divided by a power piston, a spring biasing said power piston, a fluid power inlet communicating with said work chamber, a fluid power outlet communicating with said first chamber, passage means through said power piston, and valve means connected to said input rod and controlling fluid flow through said passage means, characterized in that the valve means comprises an apply and relief valve mechanism wherein the input rod comprises a longitudinally extending valve rod having at a first end an enlarged diameter section comprising a spring retainer and at a second end a reaction piston connected thereto by attachment means, the second end of the valve rod including a plurality of longitudinally extending grooves located within the valve rod to provide a plurality of passageways between all interior diameter surface of said reaction piston located around the second end of the valve rod, spring means located between said spring retainer and reaction piston so that said reaction piston is biased into engagement with said attachment means, the relief valve mechanism disposed within a longitudinal opening of said work piston so that a portion of said reaction piston controls fluid flow through said passage means, and the passageways of said valve rod providing fluid flow through said reaction piston to preclude self actuation by said valve means.

One way of carrying out the invention is described in detail below with reference to the drawings which illustrate an embodiment in which:

FIG. 2 is an illustration of the prior apply and relief valve mechanism illustrated in FIG. 1;

FIG. 3 is an illustration of the improved apply and relief valve mechanism in accordance with the present invention; and FIG. 4 is a section view illustrating a comparison of the improved apply and relief valve mechanism in the top half of the illustration with the prior apply and relief valve mechanism in the bottom half of the illustration.

Figure 1:
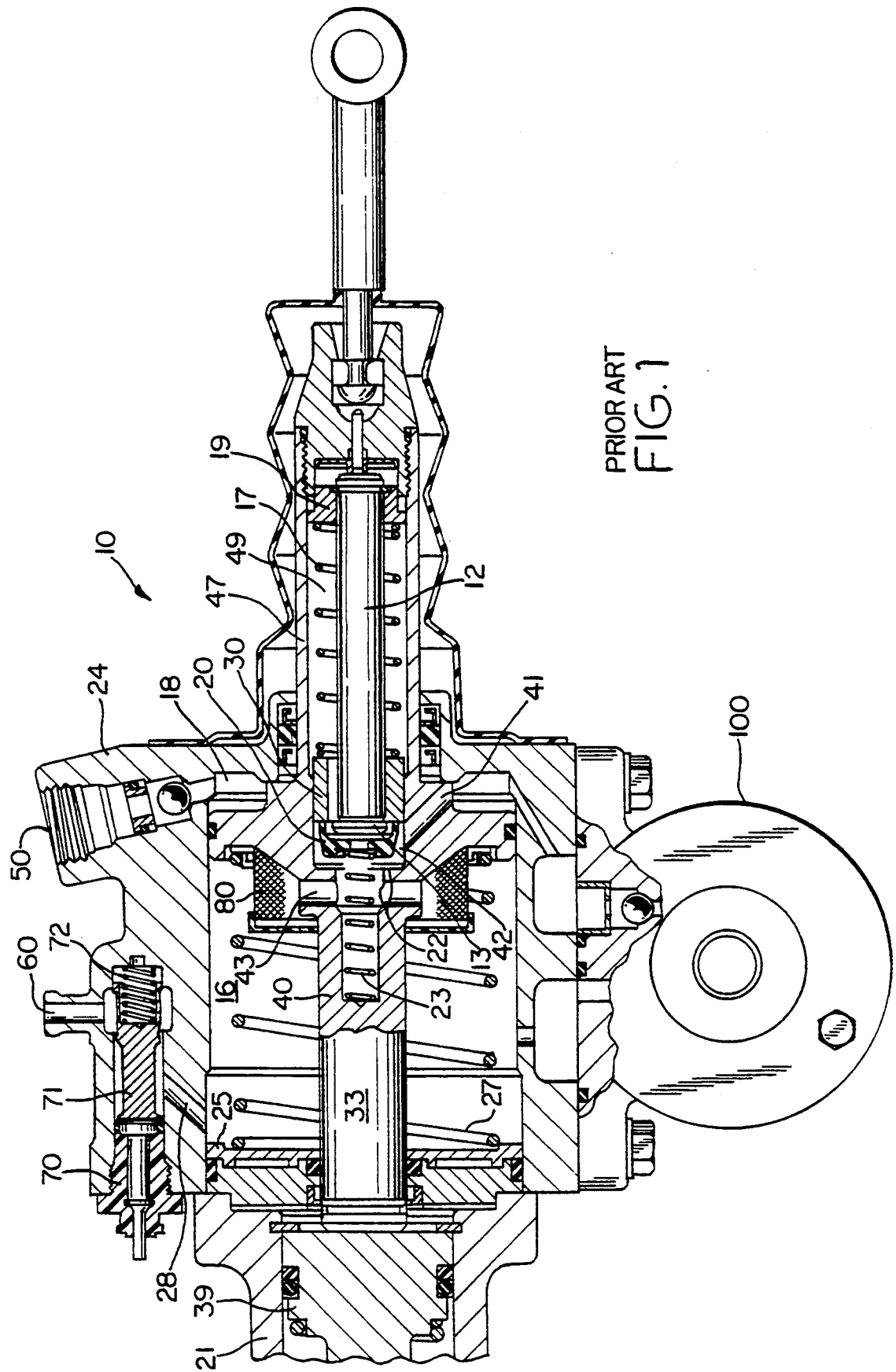
FIG. 1 is an illustration of a prior fluid power apparatus.

Fluid power apparatus 10 is illustrated in detail in FIG. 1. Input rod 12 interacts at one end with a brake pedal of the vehicle and at the other end shoulder 13 abuts reaction piston 30 which abuts valve seal 20. The other side of seal 20 abuts small spring 23 disposed within power piston 40. Valve seal 20 is located adjacent valve seat 22 of piston 40 (see also the bottom of FIG. 4). Fluid power apparatus housing 24 defines a chamber divided by piston 40 into first chamber 16 and working cheer 18. Return spring 27 engages at one end wall 25 of chamber 16 and at the other end biases piston 40. Fluid power apparatus 10 includes fluid power inlet 50 and fluid power outlet 60, inlet 50 being connected to a power sneering pump and receiving fluid pressure therefrom. The fluid power apparatus may receive fluid pressure either from a power steering apparatus or from a dedicated pump. Fluid power outlet 60 includes flow switch 70 engaged by piston 71 biased toward switch 70 by spring 72. Attached to fluid power apparatus 10 is electric pump 100 which is operatively connected to flow switch 70. Input rod 12 is housed within extension 47 of piston 40, and extension 47 is integral with piston rod 33 which engages primary piston 39 of master cylinder 21. Disposed about piston rod 33 is collapsible filter 80 disclosed in Isakson U.S. Pat. No. 4,961,846. Piston 40 includes inlet passage 41 communicating with chat/her 42 and outlet 43 so that fluid pressure received through inlet 50 is communicated through working chamber 18, passage 41, chamber 42 and outlet 43 to first chamber 16 which has at least one opening 28 communicating with fluid power outlet 60. When pressurized fluid flows through passage 41, it must flow around the end of valve seal 20 in order to move through chamber 42 and onward to outlet 43.! This flow path causes a pressure drop so that the fluid pressure in front of or to the left side of valve seal 20 comprises a low pressure compared to the pressure of the fluid being transmitted through inlet passage 41. Fluid pressure in chamber 42 may flow around unsealed reaction piston 30 and is present within piston chamber 49. In order to prevent the apply and relief valve mechanism from self actuation as a result of a higher fluid pressure in chamber 49, the fluid pressure in chamber 49 is able to flow through grooves 32, around shoulder 13 of rod 12, and through the central opening of valve seal 20.

FIG. 2 is an exploded view of the apply and relief valve mechanism illustrated in FIG. 1. Valve seal 20 abuts reaction piston 30 (see FIG. 4). Reaction piston 30 is assembled to rod 12 by sliding it over opposite end 14 and along the rod until it engages shoulder 13. Spring 17 is located around rod 12 until one end abuts reaction piston 30, and then spring retainer 19 is located on second end 14 of rod 12 and held in place by snap ring 15. Spring retainer 19 abuts spring 17 such that spring 17 biases reaction piston 30 into engagement with shoulder 13.

The improved apply and relief valve mechanism in accordance with the present invention is illustrated in FIG. 3 and the top portion of FIG. 4. In order to eliminate valve seal 20 which floats between small spring 23 and adjacent abutting reaction piston 30, a one piece valve seal 120/reaction piston 130 (generally referred to as reaction piston 130) is provided. The input rod includes valve rod 112 having first end 113, snap ring groove or attachment receiving means 111, and a plurality of longitudinally extending grooves or passageways 132. Second end 114 of valve rod 112 includes integral spring retainer 119. Valve rod 112 and spring retainer 119 comprise a single piece member. Located about valve rod 112 is spring 117 which abuts spring retainer 119 and reaction piston 130. Reaction piston 130 is coupled to valve rod 112 by means of snap ring or attachment means 115 received within attachment receiving means 111. FIG. 4 illustrates in the top portion thereof the fully assembled improved apply and relief valve mechanism when it is located within extension 47 of fluid power apparatus 10. Spring 117 biases reaction piston 130 into engagement with snap ring 115 received within groove 111 of valve rod 112. Comparing the improved apply and relief valve mechanism illustrated in the top part of FIG. 4 with the prior apply and relief valve mechanism illustrated in the bottom part of FIG. 4, valve seal 120/reaction piston 130 is an integral, single member which eliminates the separate floating valve seal or popper 20 and also provides for an improved reaction pressure acting in the direction of arrow A. Improved reaction pressure is a result of eliminating leakage at the interface of former valve seal 20 with former reaction piston 30. Additionally, flow grooves 132 permit fluid pressure within chamber 49 to flow directly or straight therethrough to chamber 42 to prevent self actuation of the apply and relief mechanism and fluid power apparatus. Such fluid flow is more direct or straight than the fluid flow illustrated in the bottom part of FIG. 4 wherein the flow is through grooves 32, past the narrow opening between shoulder 13 and the interior diameter opening of valve seal 20, and then upwardly until the flow exits via valve seal central opening 20a.

The improved apply and relief valve mechanism of the present invention is asset%bled by sliding spring 117 over valve rod 112 until it abuts spring retainer 119, sliding reaction piston 130 over end 113 of valve rod 112 so that it abuts spring 117, and inserting snap ring 115 into groove 111. Then the assembled apply and relief valve mechanism is inserted within chamber 49 of extension 47 so that the end of valve rod 112 abuts small spring 23, rather than floating valve seal 20 abutting small spring 23 as illustrated in FIGS. 1 and 4. The abutment of valve rod 112 with small spring 23 positions the valve seal 120 portion of seal 120/reaction piston 130 adjacent valve seat 22 of chamber 42 so that fluid flow through inlet passage 41 to outlet 43 may be restricted when the vehicle operator depresses a not shown brake pedal connected with input valve rod 112. Restricting fluid flow from inlet passage 41 to outlet 43 causes an increase in the fluid pressure of working chamber 18 so that the pressure differential between first chamber 16 and working chamber 18 provides a fluid power boost or assist to power piston 40 and the vehicle operator is assisted in effecting operation of master cylinder 21.

The improved apply and relief valve mechanism of the present invention has eliminated the floating valve seal or popper of the prior design, eliminated leakage between the valve seal and reaction piston interface, and provides improved fluid flow through the grooves in the valve rod to eliminate the possibility of self actuation of the valve mechanism and fluid power apparatus.

We claim:

1. An improved apply and relief valve mechanism in combination with a fluid power apparatus, the apparatus comprising a housing, an input rod, a first chamber and a work chamber divided by a power piston, a spring biasing said power piston, a fluid power inlet communicating with said work chamber, a fluid power outlet communicating with said first chamber, passage means through said power piston, and valve means connected to said input rod and controlling fluid flow through said passage means via a valve seat, characterized in that the valve means and input rod comprise an apply and relief valve mechanism wherein the input rod is a longitudinally extending valve rod having at a first end an enlarged diameter section comprising a spring retainer and at a second end a reaction piston connected thereto by attachment means, the second end of the valve rod including a plurality of longitudinally extending grooves located within the valve rod to provide a plurality of passageways between said valve rod and an interior diameter surface of said reaction piston located around the second end of the valve rod, spring means located between said spring retainer and reaction piston so that said reaction piston is biased into engagement with said attachment means, the apply and relief valve mechanism disposed within a longitudinal opening of said work piston so that a portion of said reaction piston controls fluid flow through said passage means, and the passageways of said valve rod providing improved straight fluid flow between said reaction piston and valve seat to preclude self actuation by said valve means.

2. The apparatus in accordance with claim 1, wherein said attachment means comprises a snap ring received within a groove located within said valve rod.

3. The apparatus in accordance with claim 2, wherein said spring retainer and valve rod comprise a single piece member.

4. The apparatus in accordance with claim 1, wherein the valve rod abuts directly the spring means.

5. The apparatus in accordance with claim 4, wherein the reaction piston includes a valve seal portion at an end thereof.

6. A method of providing a fluid power apparatus having an apply and relief valve mechanism with improved fluid flow therethrough, the fluid power apparatus comprising a housing, a valve rod, a first chamber and work chamber divided by a power piston, a spring biasing said power piston, a fluid power inlet communicating with said work chamber, a fluid power outlet communicating with said first chamber, passage means through said power piston, and a reaction piston connected to said valve rod and controlling fluid flow through said passage means via a valve seat, the method comprising the steps of:

providing the valve rod as a one piece member comprising a longitudinally extending member having an enlarged diameter section at one end and at an opposite second end attachment receiving means and a plurality of longitudinal passageways located in the valve rod, locating spring means about said valve rod so that the spring means abuts said enlarged diameter section, positioning a reaction piston on said second end of said valve rod, the reaction piston being generally cylindrically shaped and having a through passage receiving the second end, the reaction piston abutting said spring means, engaging attachment means with the attachment receiving means of said valve rod to retain said reaction piston on said valve rod, and the valve rod, spring means, reaction piston, and attachment means comprising the apply and relief valve mechanism, and locating the apply and relief valve mechanism within said work piston so that said reaction piston can control fluid flow through said passage means, such that the passageways of said valve rod provide improved straight fluid flow between said reaction piston and valve seat to preclude self actuation by said valve means.

7. The method in accordance with claim 6, wherein said attachment receiving means of the valve rod comprises a groove and said attachment means comprises a snap ring.

8. The method in accordance with claim 7, wherein said valve rod abuts a spring member located in the work piston to position said reaction piston a predetermined distance relative to said passage means.

9. The method in accordance with claim 8, wherein the reaction piston includes a valve seal portion at an end thereof.

* * * * *